(12) United States Patent
Tokita et al.

(10) Patent No.: US 10,180,590 B2
(45) Date of Patent: *Jan. 15, 2019

(54) LIQUID CRYSTAL DISPLAY DEVICE

(71) Applicant: Japan Display Inc., Tokyo (JP)

(72) Inventors: Masahiro Tokita, Tokyo (JP); Masashi Takahata, Tokyo (JP)

(73) Assignee: Japan Display Inc., Tokyo (JP)

( * ) Notice: Subject to any disclaimer, the term of this patent is extended or adjusted under 35 U.S.C. 154(b) by 205 days.

This patent is subject to a terminal disclaimer.

(21) Appl. No.: 15/178,846

(22) Filed: Jun. 10, 2016

(65) Prior Publication Data

US 2016/0283039 A1    Sep. 29, 2016

Related U.S. Application Data

(63) Continuation of application No. 14/094,991, filed on Dec. 3, 2013, now Pat. No. 9,535,278.

(30) Foreign Application Priority Data

Dec. 6, 2012  (JP) ................................ 2012-267279

(51) Int. Cl.
*G06F 3/045* (2006.01)
*G02F 1/1333* (2006.01)
(Continued)

(52) U.S. Cl.
CPC ........ *G02F 1/13338* (2013.01); *G02F 1/1309* (2013.01); *G02F 1/1368* (2013.01);
(Continued)

(58) Field of Classification Search
None
See application file for complete search history.

(56) References Cited

U.S. PATENT DOCUMENTS

| 8,319,737 B2 | 11/2012 | Noguchi et al. |
| 2002/0085169 A1 | 7/2002 | Choi et al. |

(Continued)

FOREIGN PATENT DOCUMENTS

| CN | 101308306 A | 11/2008 |
| CN | 101556783 A | 10/2009 |

(Continued)

OTHER PUBLICATIONS

Chinese Office Action dated Feb. 1, 2016, for corresponding Chinese Patent Application No. 2013106521794.

(Continued)

*Primary Examiner* — Christopher R Lamb
(74) *Attorney, Agent, or Firm* — Typha IP LLC

(57) ABSTRACT

A liquid crystal display device with a plurality of pixels arranged in a matrix includes a first substrate, a second substrate, a liquid crystal interposed between the first and the second substrates, and a detection circuit. The second substrate includes a detection electrode for a touch panel. The respective pixels have pixel electrodes and counter electrodes. The counter electrode divided into a plurality of blocks is provided common to the respective pixels on a plurality of consecutive display lines. The counter electrode divided into blocks serves as the scanning electrode for the touch panel. The detection circuit includes a calibration capacity element provided for each of the detection electrodes, is having one end connected to the detection electrode, and supplies a calibration voltage to the other end of the calibration capacity element in a touched position detection process.

9 Claims, 12 Drawing Sheets

(51) Int. Cl.
  *G06F 3/041* (2006.01)
  *G02F 1/13* (2006.01)
  *G09G 3/36* (2006.01)
  *G02F 1/1335* (2006.01)
  *G02F 1/1368* (2006.01)
  *G06F 3/044* (2006.01)
  *G02F 1/1362* (2006.01)
  *G02F 1/1343* (2006.01)

(52) U.S. Cl.
  CPC .. *G02F 1/133528* (2013.01); *G02F 1/134309* (2013.01); *G02F 1/136286* (2013.01); *G06F 3/044* (2013.01); *G06F 3/0412* (2013.01); *G06F 3/0414* (2013.01); *G06F 3/0418* (2013.01); *G09G 3/3655* (2013.01); *G02F 2001/133302* (2013.01); *G02F 2001/134318* (2013.01); *G02F 2001/136254* (2013.01); *G02F 2202/28* (2013.01); *G06F 2203/04102* (2013.01); *G09G 2354/00* (2013.01)

(56) References Cited

U.S. PATENT DOCUMENTS

| | | |
|---|---|---|
| 2006/0114247 A1 | 6/2006 | Brown |
| 2009/0256818 A1 | 10/2009 | Noguchi et al. |
| 2010/0026639 A1 | 2/2010 | Lee et al. |
| 2010/0110040 A1 | 5/2010 | Kim et al. |
| 2011/0140720 A1 | 6/2011 | Kurashima |
| 2011/0193817 A1* | 8/2011 | Byun .............. G06F 3/0418 345/174 |
| 2011/0261005 A1* | 10/2011 | Joharapurkar ...... G06F 3/0418 345/174 |
| 2012/0217978 A1 | 8/2012 | Shen et al. |
| 2013/0082977 A1 | 4/2013 | Noguchi et al. |
| 2013/0307813 A1* | 11/2013 | Hanssen ............ G06F 3/044 345/174 |

FOREIGN PATENT DOCUMENTS

| | | |
|---|---|---|
| CN | 101937662 A | 1/2011 |
| CN | 102096533 A | 6/2011 |
| JP | 2009-258182 A | 11/2009 |

OTHER PUBLICATIONS

Extended European search report issued by the European Patent Office dated Jun. 20, 2016 for European patent application No. 13195526.2.

\* cited by examiner

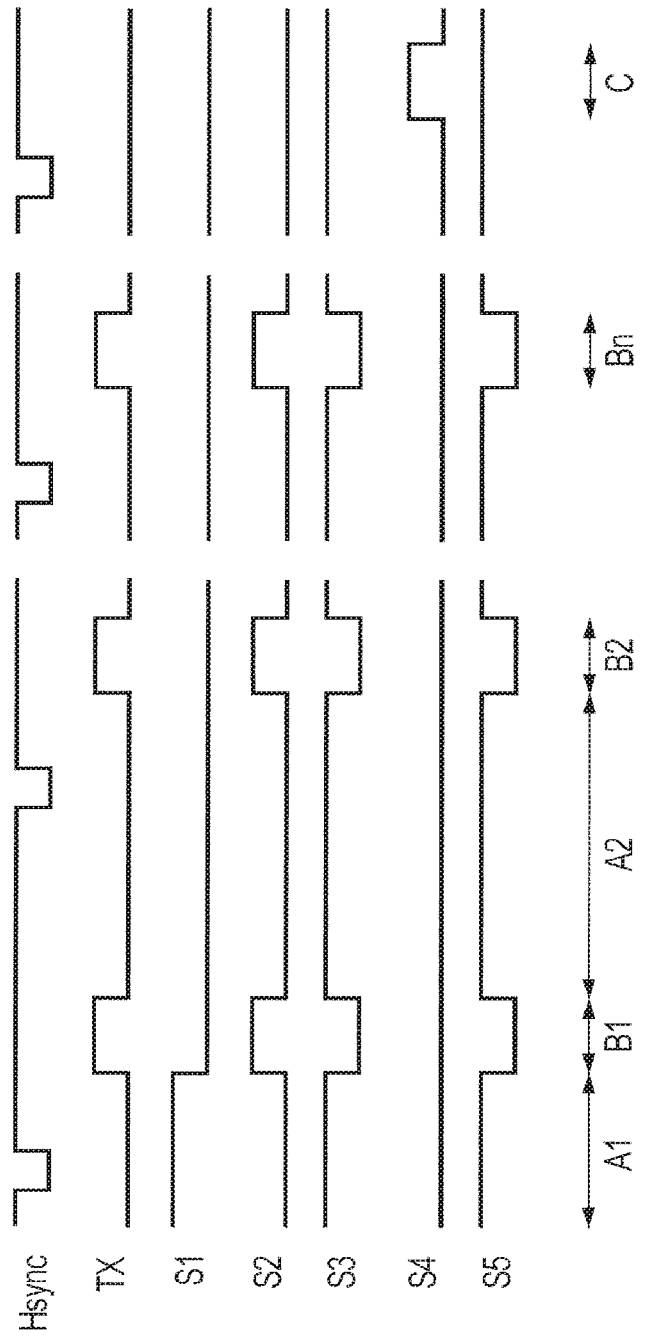

| | R0 | R1 | R2 | R3 | R4 | R5 |
|---|---|---|---|---|---|---|
| C0 | 1023 | 0 | 1023 | 0 | 1023 | 0 |
| C1 | 1023 | 0 | 1023 | 0 | 1023 | 0 |
| C2 | 1023 | 0 | 1023 | 0 | 1023 | 0 |
| C3 | 1023 | 0 | 1023 | 0 | 1023 | 0 |
| C4 | 1023 | 0 | 1023 | 0 | 1023 | 0 |
| C5 | 1023 | 0 | 1023 | 0 | 1023 | 0 |
| C6 | 1023 | 0 | 1023 | 0 | 1023 | 0 |
| C7 | 1023 | 0 | 1023 | 0 | 1023 | 0 |
| C8 | 1023 | 0 | 1023 | 0 | 1023 | 0 |
| C9 | 1023 | 0 | 1023 | 0 | 1023 | 0 |
| C10 | 1023 | 0 | 1023 | 0 | 1023 | 0 |

FIG. 15B

| | R0 | R1 | R2 | R3 | R4 | R5 |
|---|---|---|---|---|---|---|
| C0 | 1023 | 1023 | 1023 | 0 | 1023 | 0 |
| C1 | 1023 | 1023 | 1023 | 0 | 1023 | 0 |
| C2 | 1023 | 1023 | 1023 | 0 | 1023 | 0 |
| C3 | 1023 | 1023 | 1023 | 0 | 1023 | 0 |
| C4 | 1023 | 1023 | 1023 | 0 | 1023 | 0 |
| C5 | 1023 | 1023 | 1023 | 0 | 1023 | 0 |
| C6 | 1023 | 1023 | 1023 | 0 | 1023 | 0 |
| C7 | 1023 | 1023 | 1023 | 0 | 1023 | 0 |
| C8 | 1023 | 1023 | 1023 | 0 | 1023 | 0 |
| C9 | 1023 | 1023 | 1023 | 0 | 1023 | 0 |
| C10 | 1023 | 1023 | 1023 | 0 | 1023 | 0 |

LIQUID CRYSTAL DISPLAY DEVICE

CROSS-REFERENCE TO RELATED APPLICATIONS

This application is a continuation of U.S. patent application Ser. No. 14/094,991, filed on Dec. 3, 2013. Further, this application claims priority from Japanese application JP2012-267279 filed on Dec. 6, 2012, the content of which is hereby incorporated by reference into this application.

BACKGROUND

The present invention relates to a liquid crystal display device, and more particularly, to the art efficiently applied to an in-cell type liquid crystal display device with a built-in touch panel.

The display device is provided with a unit for inputting information (hereinafter referred to as a touch sensor or a touch panel) through touch operations (contact-pressing operation which will be simply referred to as touching) on the display surface by means of a user's finger or a pen, and used for mobile electronic devices, for example, PDAs and mobile terminals, various kinds of home electric appliances, and automated teller machines.

As the aforementioned touch panel, an electrostatic capacity system for detecting change in the capacity of the touched area has been known.

For example, as JP-A-2009-258182 discloses, the in-cell liquid crystal display device with a touch panel function built-in the liquid crystal display panel has been well known as the electrostatic capacity type touch panel.

A scanning electrode for the touch panel of the in-cell type liquid crystal display device is derived from dividing a counter electrode (common electrode) formed on a first substrate (TFT substrate) into blocks, which constitutes the liquid crystal display panel.

The touch panel of the in-cell type liquid crystal display device is of coupling capacity detection type, and detects a touched position through detection of a cross capacity Cxy between the scanning electrode formed on the first substrate of the liquid crystal display panel and a detection electrode formed on a second substrate of the liquid crystal display panel.

The cross capacity Cxy has to be calibrated because of individual difference and variation in the plane resulting from variation and non-uniformity in permittivity and thickness of the liquid crystal layers, glass substrates that constitute the first and the second substrates, polarizing plates and adhesive resins.

In the shipment inspection stage of the touch panel of the in-cell type liquid crystal display device, the metal plate with the area sufficient, to cover the entire surface of the touch panel is disposed. If the difference values of all the intersections of the scanning electrodes and the detection electrodes in Raw data between the cases before and after disposing the metal plate are within the specified range, the touch panel may be considered as being acceptable.

The metal plate inspection may be carried, out within a short period of time. Meanwhile, it is difficult to detect the adjacent short-circuit failure between the two adjacent detection electrodes. The aforementioned adjacent short-circuit failure includes the one which occurs in the wiring on a flexible wiring substrate connected to the two adjacent detection electrodes.

The adjacent short-circuit failure between the two adjacent detection electrodes may be detected through the point inspection for each intersection between the scanning electrodes and the detection electrodes. However, it takes time for the inspection, thus significantly deteriorating the production efficiency. The method of conducting an open short-circuit inspection with a test pad disposed on the wiring connected to the detection electrode on the flexible wiring substrate has a disadvantage of higher susceptibility to noise and static electricity, or increase in size of the flexible wiring substrate.

SUMMARY

The present invention provides a liquid crystal display device with a built-in touch panel function, allowing efficient calibration of the cross capacity.

The present invention further provides the liquid crystal display device with the built-in touch panel function, allowing detection of the adjacent short-circuit failure between two adjacent detection electrodes by means of a circuit for calibrating the cross capacity.

The aforementioned and other objects and new features will be clarified by the following description and accompanying drawings.

The present invention to be disclosed herein may be summarized as described below.

The present invention is configured to provide each detection electrode with the calibration capacity, having one end to which the calibration voltage VDAC is applied, and to vary a charge extraction amount by adjusting the calibration voltage VDAC so as to efficiently carry out the calibration.

The present invention is further configured to inspect the adjacent short-circuit failure between the two adjacent detection electrodes including the wiring on the flexible wiring substrate through the calibration circuit.

In the inspection of the adjacent short-circuit failure, the calibration voltage that extracts no charge (for example, reference voltage of VREF) is applied to the end of the calibration capacity connected to the odd-numbered detection electrode, and the calibration voltage (for example, GND voltage) allowed to sufficiently extract the charge is applied to the one connected to the even-numbered detection electrode.

If no short-circuit occurs between the two adjacent detection electrodes, the Raw data detected by the odd-numbered detection electrode and converted by an AD converter come into "0" in 10 bits, for example. If the short-circuit occurs between the two adjacent detection electrodes, the Raw data detected by the odd-numbered detection electrode and converted by the AD converter come into [1023] in 10 bits. This makes it possible to simply detect the adjacent short-circuit failure between the detection electrodes for a short period of time.

The present invention described herein provides the following advantages to be briefly explained as follows.

(1) The liquid crystal display device with the built-in touch panel function according to the present invention allows efficient calibration of the cross capacity.

(2) The liquid crystal display device with the built-in touch panel function according to the present invention allows detection of the adjacent short-circuit failure between two adjacent detection electrodes by means of the circuit for calibrating the cross capacity.

BRIEF DESCRIPTION OF THE DRAWINGS

FIG. 9 is a timing chart for explaining operations of the circuit shown in FIG. 8;

FIGS. 10A to 10C show address maps of the touch panel, a detection. RAM, and a calibration RAM of the in-cell type liquid, crystal display device according to the example of the present invention, respectively;

FIGS. 15A and 15B show Raw data stored in the detection RAM obtained when there is no short-circuit between the two adjacent detection electrodes, and when there is the short-circuit between the two adjacent electrodes of the in-cell type liquid crystal display device according to the example of the present invention, respectively.

DESCRIPTION OF THE PREFERRED EMBODIMENTS

Figure 1A:
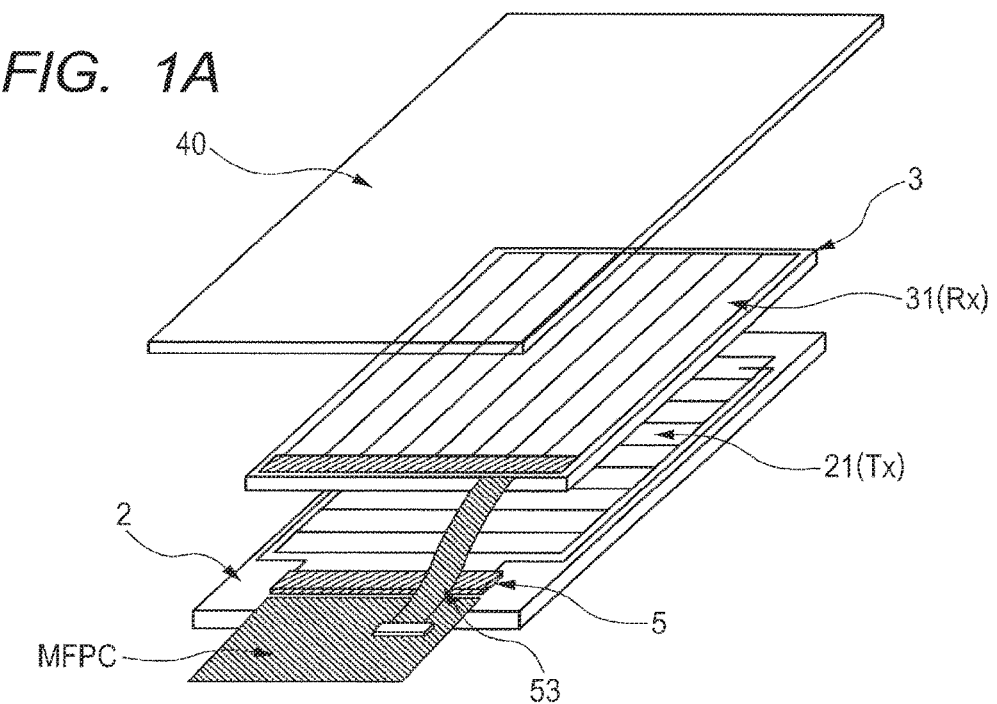
FIG. 1A is an exploded perspective view schematically illustrating an exemplary structure of an in-cell type liquid crystal display device having a touch panel built in a liquid crystal display panel.

An example according to the present invention will be described in detail referring to the drawings.

An element having the same function will be designated with the same code in all the drawings for explaining the example, and a repetitive explanation of such element, thus, will be omitted. The following example is not intended to limit the scope of the present invention.

FIG. 1A is an exploded perspective view schematically illustrating an exemplary structure of the in-cell type liquid crystal display device having the touch panel, built in the liquid crystal display panel.

Figure 1B:
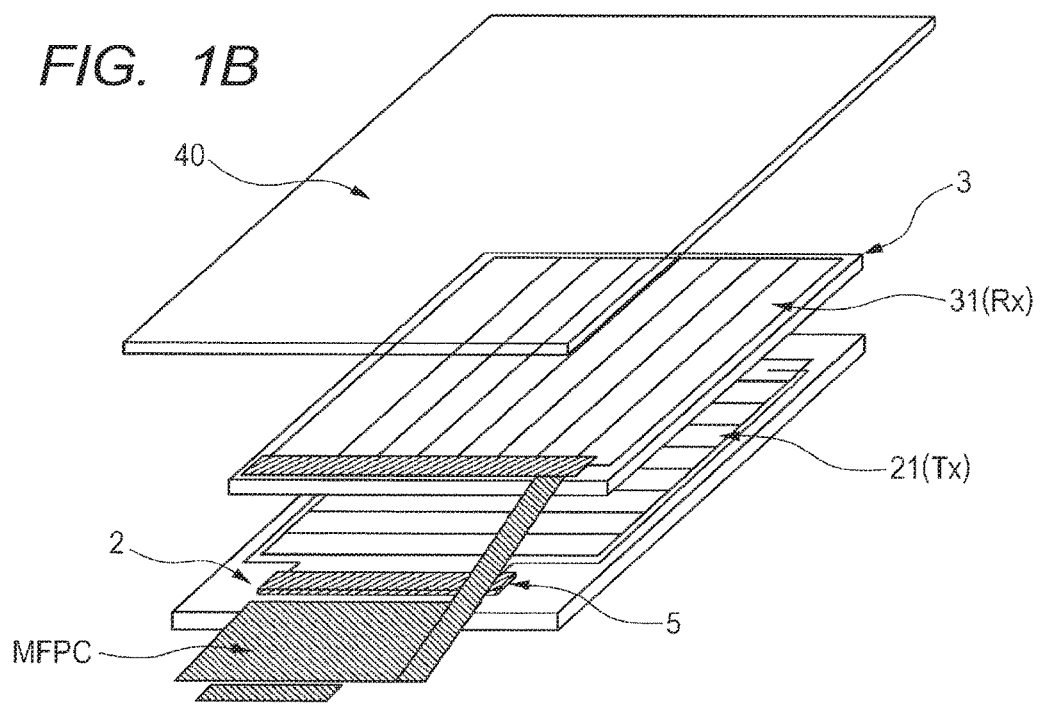
FIG. 1B is an exploded perspective view schematically illustrating another exemplary structure of the in-cell type liquid crystal display device having the touch panel built in the liquid crystal display panel.

FIG. 1B is an exploded perspective view schematically illustrating another exemplary structure of the in-cell type liquid crystal display device having the touch panel built in the liquid crystal display panel.

The in-cell type liquid crystal display device illustrated in FIG. 1B is configured to integrate a main flexible wiring substrate MFPC and a flexible wiring substrate 53 for connection as shown in FIG. 1A for cost reduction.

FIGS. 1A and 1B show a first substrate 2 (hereinafter referred to as a TFT substrate), a second substrate 3 (hereinafter referred to as a CF substrate), a counter electrode (common electrode) 21, a liquid crystal driver IC the main flexible wiring substrate MFPC, a front window 40, and the flexible wiring substrate 53 for connection.

The liquid crystal display device shown in FIGS. 1A and 1B is configured to divide a transparent conducting layer (CD) on the CF substrate 3 at the rear surface side into band-like patterns each serving as a detection electrode 31 for the touch panel, and to divide the counter electrode 21 formed inside the TFT substrate 2 into band-like patterns, that is, a plurality of blocks each serving as a scanning substrate for the touch panel, thus reducing the number of the touch panel substrates used for the generally employed touch panel. The liquid crystal display device as illustrated in FIGS. 1A and 1B has a circuit for driving the touch panel provided inside the liquid crystal driver IC 5.

Figure 2:
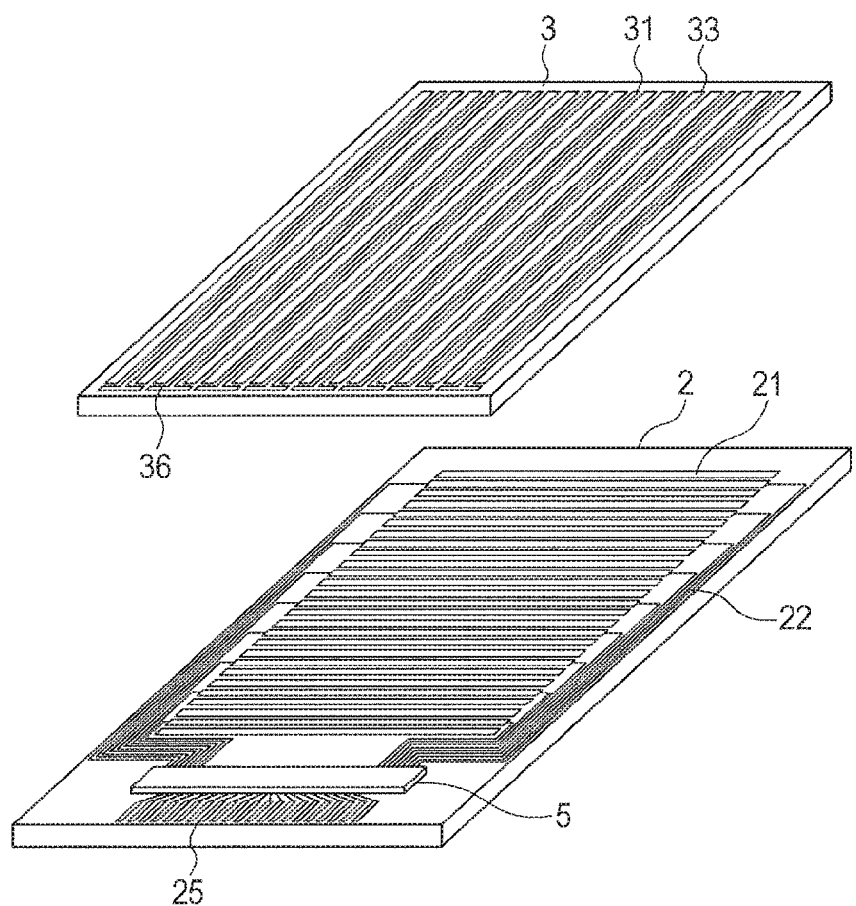
FIG. 2 is an explanatory view illustrating counter electrodes and detection electrodes of the liquid crystal display device as shown in FIGS. 1A and 1B.

Referring to FIG. 2, the counter electrode 21 and the detection electrode 31 of the liquid crystal display device as illustrated. FIGS. 1A and 1B will be described.

As described above, a plurality of counter electrodes 21 (for example, 32 electrodes) disposed on the TFT substrate 2 have both ends commonly connected, respectively, and are connected to a counter electrode signal line 22.

The band-like counter electrodes 21 of the liquid crystal display device shown in FIG. 2 serve as scanning electrodes (TX), and the detection electrodes 31 constitute the detection electrodes (RX).

A counter electrode signal contains a counter voltage used for displaying images and a touch panel scanning voltage used for detecting the touched position. When the touch panel scanning voltage is applied to the counter electrode 21, the detection electrode 31 arranged apart from the counter electrode 21 at a predetermined interval for constituting the capacity generates a detection signal. The detection signal is extracted outside via a detection electrode terminal 36.

Dummy electrodes 33 are provided at both sides of the detection electrode 31. The detection electrode 31 has its one end portion widened toward the dummy electrode 33 to form the detection electrode terminal 36 with a T-like shape. The TFT substrate 2 has various wirings and terminals such as a driving circuit input terminal 25 in addition to the counter electrode signal line 22.

Figure 3:
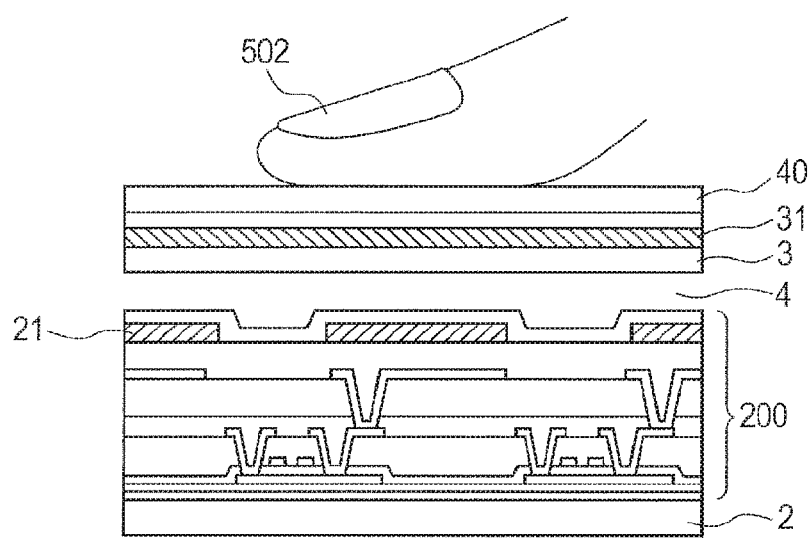
FIG. 3 is a schematic sectional view representing an enlarged part of a cross-section of a display for the liquid crystal display device as shown in FIGS. 1A and 1B.

FIG. 3 is a partially enlarged sectional view of a display of the liquid crystal display device as illustrated in FIGS. 1A and 1B.

Referring to FIG. 3, a pixel section 200 is provided on the TFT substrate 2. The counter electrode 21 is used as a part of the pixel for displaying the image. A liquid crystal composition 4 is interposed between the TFT substrate 2 and the CF substrate 3. The detection electrode 31 on the CF substrate 3 and the counter electrode 21 above the TFT substrate 2 constitute a capacity so that the voltage of the detection electrode 31 changes upon application of the drive signal to the counter electrode 21.

At this time, when a conductor, for example, a finger 502 approaches or comes in contact with the display via the front window 40, the capacity changes to vary the voltage generated in the detection electrode 31 in comparison with the case of no approach or contact.

Detection of the aforementioned change in the capacity between the counter electrode 21 and the detection electrode 31 of the liquid crystal display panel allows the liquid crystal display panel to have the touch panel function.

Figure 4:
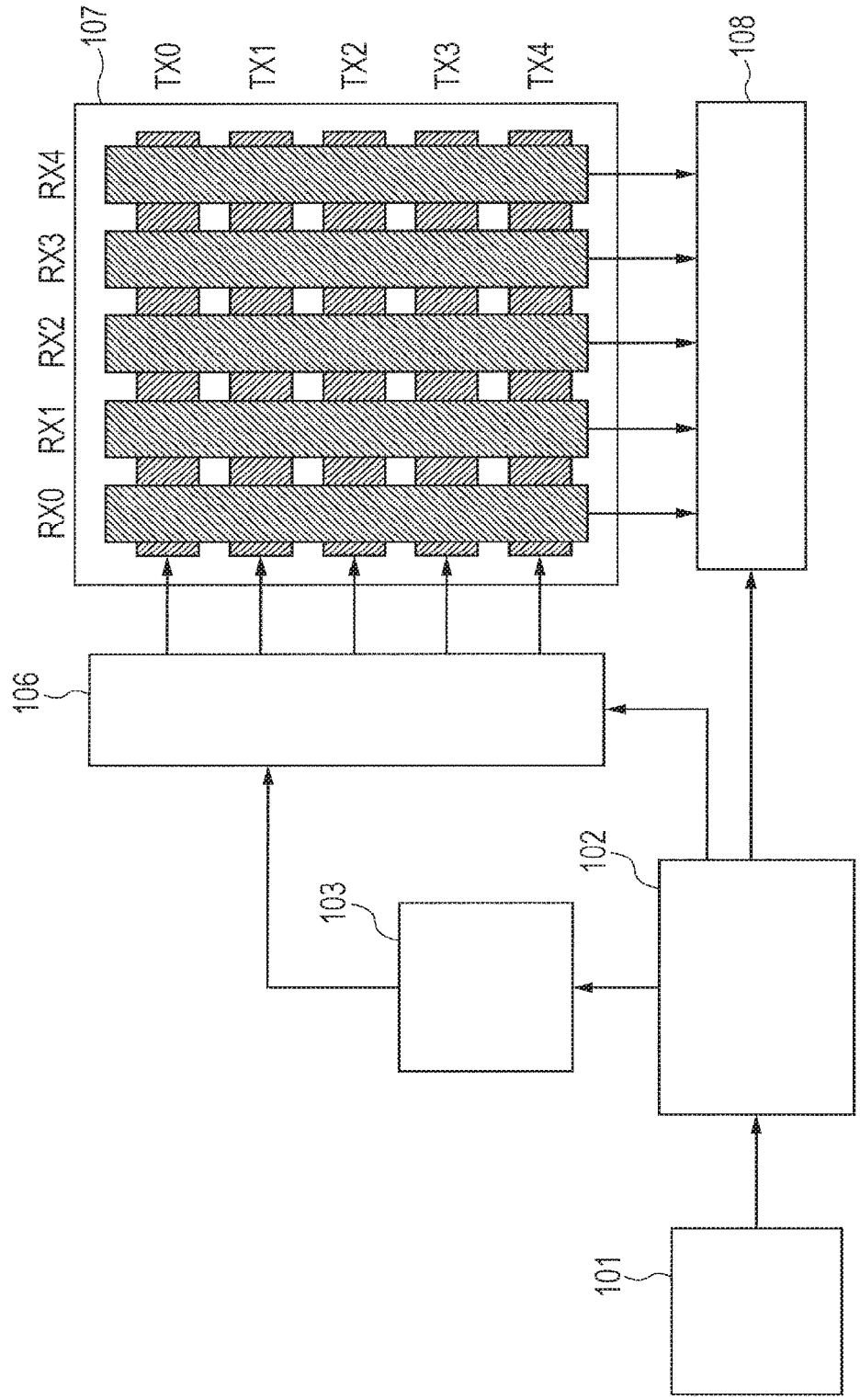
FIG. 4 is a block diagram schematically showing an overall structure of the touch panel for the in-cell type liquid crystal display device as premises for the present invention.

FIG. 4 is a block diagram schematically representing an overall structure of the touch panel of the in-cell type liquid crystal display device as premises for the present invention.

FIG. 4 shows the structure including an LCD driver 101, a sequencer 102, a touch panel scanning voltage generation circuit 103, a decoder circuit 106, a touch panel 107, and a detection circuit 108.

The touch panel 107 has electrode patterns (scanning electrodes TX0 to TX4, detection electrodes RX0 to RX4), each serving as a sensor terminal for detecting the user's touching operation.

The in-cell type liquid crystal display device as premises for the present invention has a liquid crystal display panel with the built-in touch panel function. The band-like counter electrode 21 as illustrated in FIG. 2 serves as the scanning electrode (TX), and the detection electrode 31 constitute the detection electrode (RX).

The LCD driver 101 sends synchronization signals (a vertical synchronization signal Vsync and a horizontal synchronization signal Hsync) to the sequencer 102 for displaying the image on the liquid crystal display panel. The sequencer 102 is configured to control the touch panel scanning voltage generation circuit 103, the decoder 106, and the detection circuit 108 for controlling the touch detection timing.

The touch panel scanning voltage generation circuit 103 generates and outputs a touch panel scanning voltage Vstc for driving the scanning electrodes TX0 to TX4.

The decoder 106 is an analog switch (demultiplexer) which outputs the touch panel scanning voltage Vstc to one of the scanning electrodes TX0 to TX4 based on a selection signal received from the sequencer 102.

The detection circuit 108 detects a capacity between electrodes (coupling capacity) at the intersection between one of the scanning electrodes TX0 to TX4, to which the touch panel scanning voltage Vstc is applied, and each of the detection electrodes RX0 to RX4.

Figure 5:
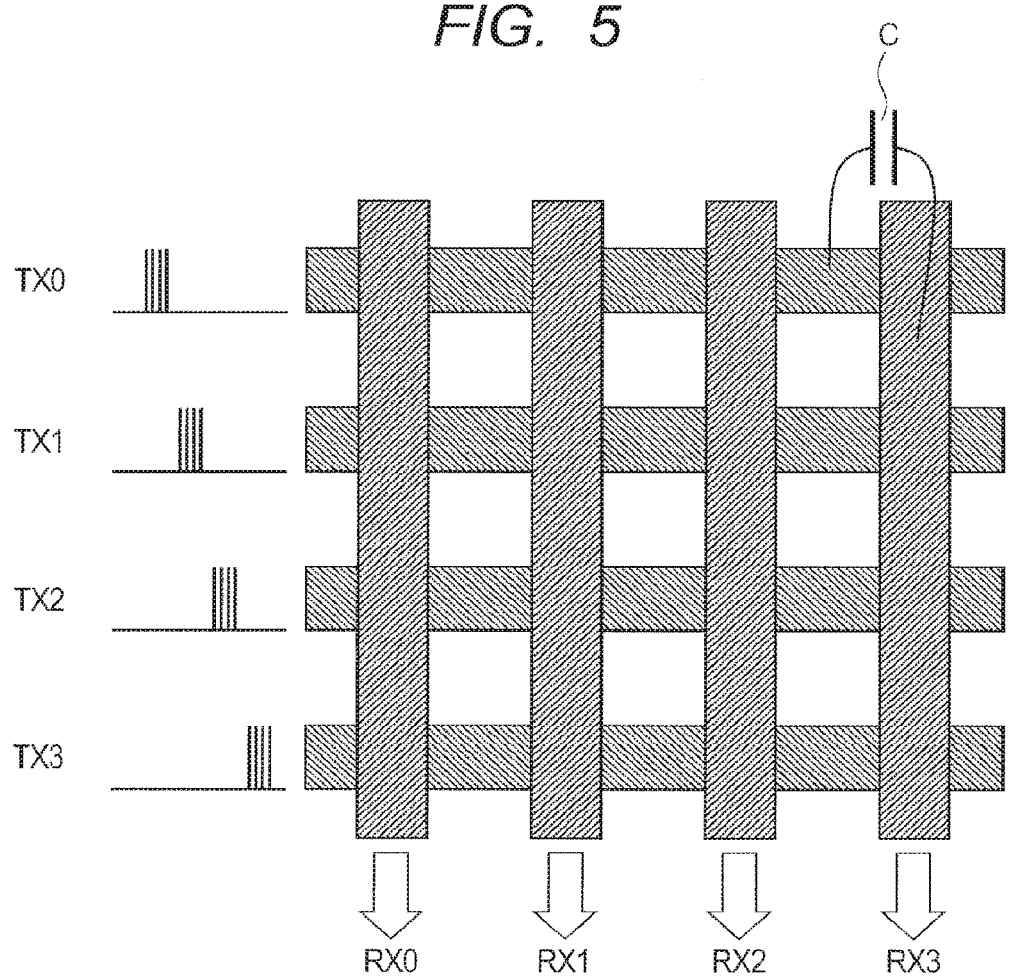
FIG. 5 is an explanatory view representing a detection principle of the touch panel for the in-cell type liquid crystal display device as premises for the present invention.

FIG. 5 is an explanatory view representing a detection principle of the touch panel for the in-cell type liquid crystal display device as premises for the present invention.

Figure 6:
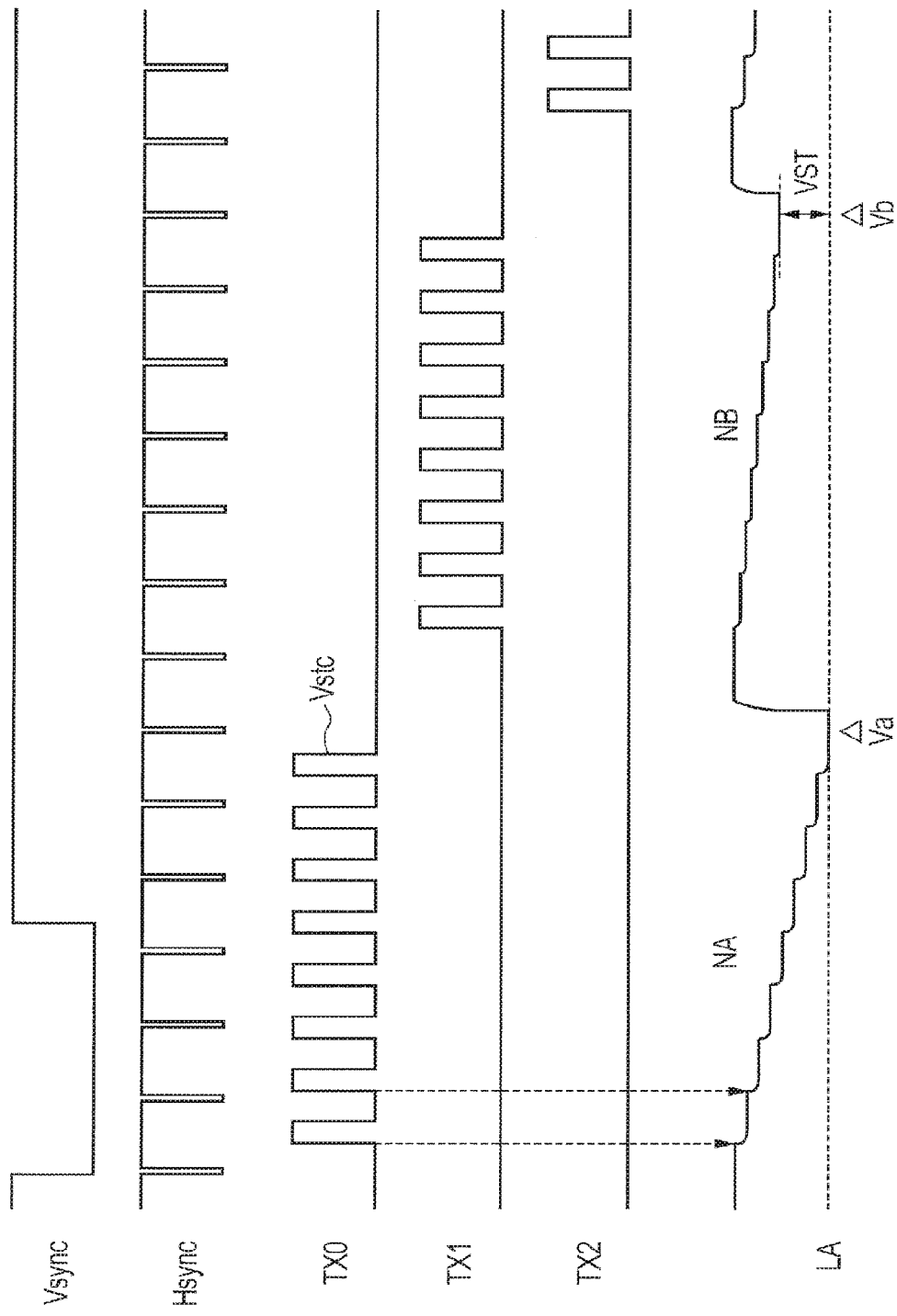
FIG. 6 is a timing chart representing detection of touching operations on the touch panel for the in-cell type liquid crystal display device as premises for the present invention.

FIG. 6 is a timing chart of the touch detection operations performed in the in-cell type liquid crystal display device as premises for the present invention.

The sequencer 102 controls the touch panel scanning voltage generation circuit 103 and the like to supply the touch panel scanning voltage Vstc to the scanning electrodes TX0 to TX4 sequentially in synchronization with the vertical synchronization signal Vsync and the horizontal synchronization signal Hsync. As FIGS. 5 and 6 show, the touch panel scanning voltage Vstc is supplied to the respective scanning electrodes a plurality of times (8 times as indicated by FIG. 6).

Referring to FIG. 6, the detection circuit 108 integrates the current flowing to the respective detection electrodes RX0 to RX4 (integration to the negative direction as shown in FIG. 6), and records resultant voltage values ΔVa, ΔVb. If the finger (conductor) touches the point around the intersection between the scanning electrode TX and the detection electrode RX, the current is applied to the finger. This may change the voltage value as the integration result.

Referring to FIG. 6, if no finger exists on the point around the intersection between the scanning electrode TX0 and the detection electrode RXn (noncontact state as indicated by NA of FIG. 6), the voltage derived from integrating the current, flowing to the detection electrodes is brought into the noncontact level LA.

On the contrary, if the finger exists on the point around the intersection between the scanning electrode TX2 and the detection electrode RXn (contact state as indicated by NB of FIG. 6), the current flows to the finger. The voltage derived from integrating the current flowing to the detection electrodes is brought into the voltage at higher potential than the noncontact level LA. The aforementioned difference (touch signal) enables detection of the touched position.

Figure 7:
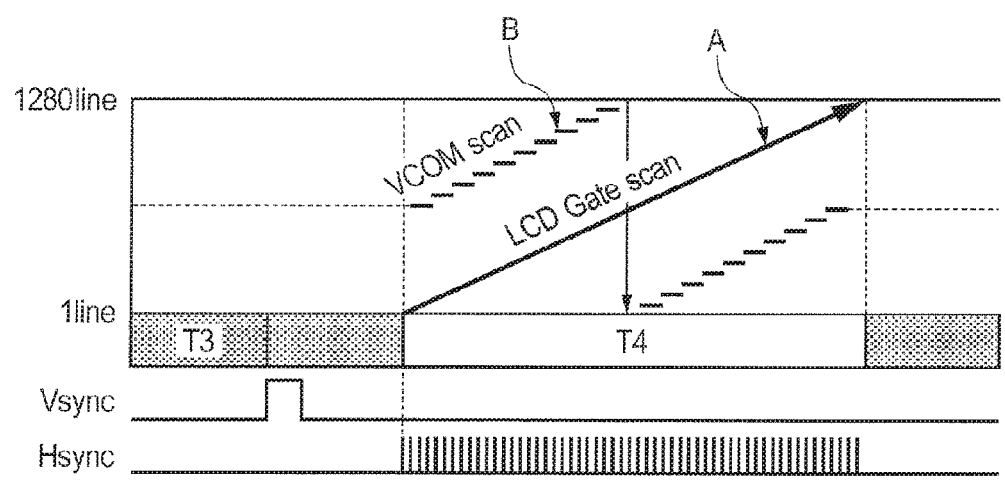
FIG. 7 is an explanatory view representing timings of detecting the touching with the touch panel, and writing pixels, which are performed in the in-cell type liquid crystal display device as premises for the present invention.

FIG. 7 is an explanatory view representing timings of the touch panel detection and pixel writing, which are performed in the in-cell type liquid crystal display device as premises for the present invention. Referring to FIG. 7, T3 denotes a flyback period, Vsync denotes the vertical synchronization signal, and Hsync denotes the horizontal synchronization signal.

A code A shown in FIG. 7 denotes the pixel writing timing in a single frame pixel writing period T4 from the first to the 128th display lines. A code B shown in FIG. 7 denotes the touch panel detection timing for each of the counter electrodes CT1 to CT20 as the 20 divided blocks.

As FIG. 7 shows, the counter electrode of the arbitrary display line is allowed to serve as the scanning electrode TX, and scanning in the touch panel detection is performed at the location different from the gate scan for the pixel writing.

As described referring to FIG. 7, the gate scan and the touch panel scan are carried out on the different display lines. Parasitic capacities exist between the video line and the counter electrode CT, and between the scanning line and the counter electrode CT. Fluctuation in the voltage on the video line VDL, or noise which is generated upon rising or falling of the scanning voltage VGL may deteriorate, the detection sensitivity in the touch panel detection.

The in-cell type liquid crystal display device as premises for the present invention is configured to carry out the touched position detection in the period of no fluctuation in the voltage VDL on the video line, rising or falling of the scanning voltage VGL.

Figure 8:
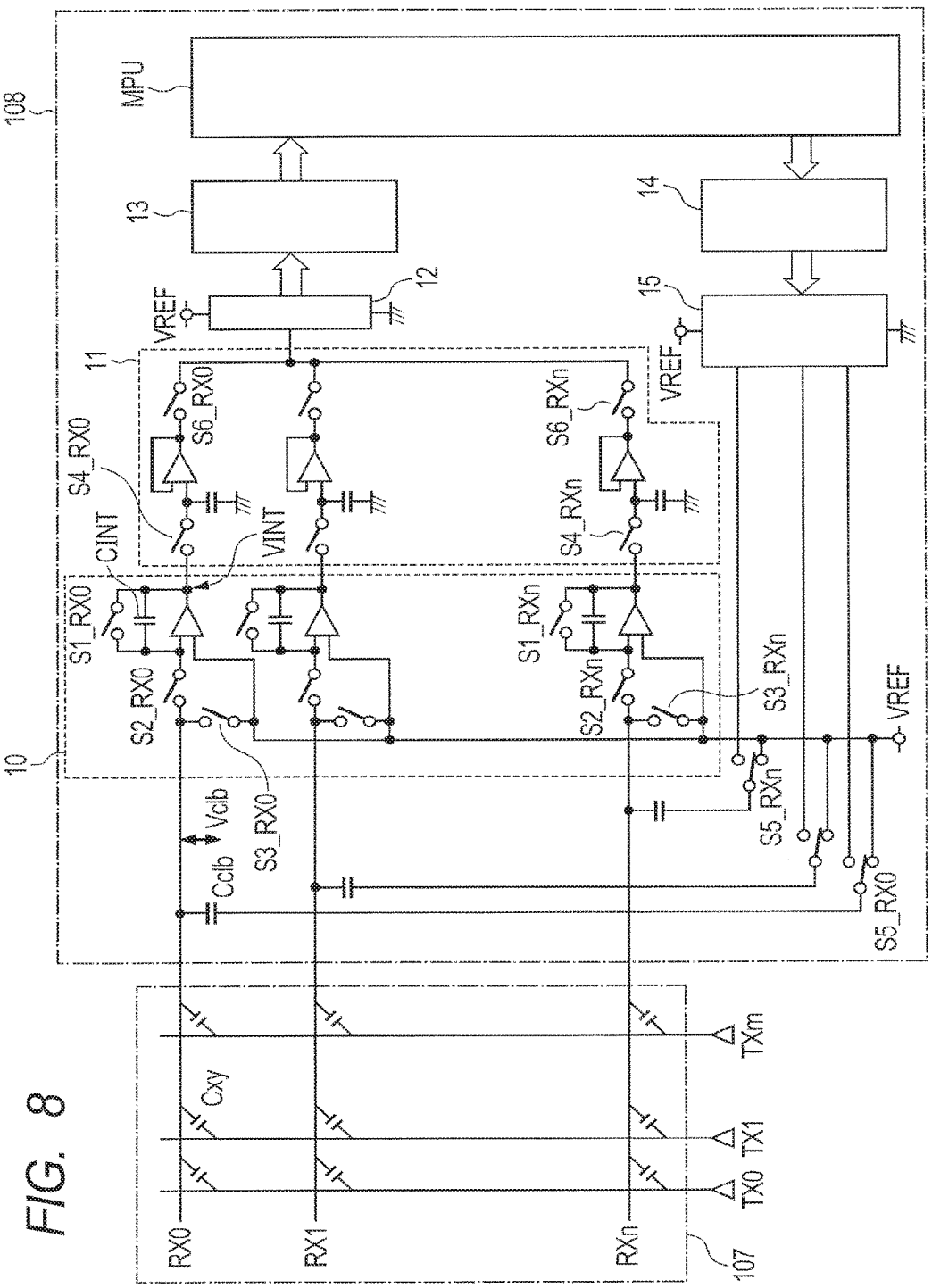
FIG. 8 is a circuit diagram representing a specific structure of the detection circuit of the in-cell, type liquid crystal display device according to an example of the present invention.

FIG. 8 is a circuit diagram representing a specific structure of the detection circuit 108 of the in-cell type liquid crystal display device according to the example of the present invention.

FIG. 9 is a timing chart for explaining operations of the circuit shown in FIG. 8.

FIG. 8 shows the detection circuit 108 including a microcomputer MPU, an integration capacity CINT, a calibration capacity Cclb, an integration circuit 10, a sample-hold circuit 11, a 10-bit AD converter 12, a detection RAM 13 for storing data output from the AD converter 12 (hereinafter referred to as Raw data), a calibration RAM 14, an 8-bit DA converter 15, and the touch panel 107.

The operation of the detection circuit 108 according to the example will be described referring to FIG. 9. The code Hsync shown in FIG. 4 denotes the horizontal synchronization signal.

(1) Before detecting (integrating) the current flowing to the respective detection electrodes (RX0 to Rxn), a switch S1 is turned ON to reset the integration circuit 10, and simultaneously, a switch S3 is turned ON to reset the respective detection electrodes (RX0 to RXn) (for a period A1 shown in FIG. 9). The reference voltage VREF is set to 4V (VREF=4V) so that the output of the integration circuit 10 is preliminarily charged to 4V, and each of the respective detection electrodes RX0 to RXn is preliminarily charged to 4V.

A switch S5 is connected to the reference voltage VREF, and the reference voltage VREF of 4V is applied to both ends of the calibration capacity Cclb. Accordingly, the charge of the calibration capacity Cclb is "0".

(2) After turning the switches S1 and S3 OFF, the touch panel scanning voltage Vstc is output from one of the scanning electrodes TX0 to TXm to select the switch S5 to the DA converter 15. The calibration voltage VDAC output from the DA converter 15 is applied to one end of the calibration capacity Cclb. After extraction of the charge, the switch S2 is turned ON to integrate the remaining charge with the integration capacity CINT (for period B1 shown in FIG. 9).

In this way, the current flows along the path through one of the scanning electrodes TX0 to TXm, the cross capacity Cxy, and the integration capacity CINT. As a result, the output voltage VINT of the integration circuit 10 is lowered.

The relationship of (charge of the cross capacity Cxy)−(charge of the calibration capacity Cclb)=charge of the integration capacity CINT leads to the formula of VINT=VREF−(Vstc×Cxy−Vclb×Cclb)/Cint.

The code Cint denotes a capacity value of the integration capacity (CINT), and Vclb denotes the voltage applied to both ends of the calibration capacity Cclb. Then the equation of Vclb=VREF−VDAC is established.

(3) After the integration circuit 10 finishes integration, the switch S2 is turned OFF, the switch S3 is turned ON, and the switch S5 is connected to the reference voltage VREF so as to preliminarily charge the respective detection electrodes RX0 to RXn to 4V, and set the charge of the calibration capacity Cclb to "0" (for period A2 shown in FIG. 9).

(4) The integration in the process step (2) is repeatedly carried out by the integration circuit 10 to superpose the voltage (period of B2, . . . shown in FIG. 9).

(5) After the integration circuit 10 finishes the integration (after the end of the period Bn shown in FIG. 9), a switch S4 is turned ON to allow the sample-hold circuit 11 to perform sample and hold operations (period C shown in FIG. 9). Thereafter, a switch S6 is turned ON sequentially so that the AD converter 12 carries out AD conversion, and the detection RAM 13 stores the Raw data corresponding to the scanning electrodes RX0 to RXn.

If the 10-bit AD converter is employed as the AD converter 12, the Raw data may be in the range from 0 (integration 0V) to 1023 (integration 4V).

(6) The process steps (1) to (5) are sequentially carried out for all the scanning electrodes TX0 to TXm so that the Raw data of the intersections between the respective scanning electrodes TX0 to TXm and the respective detection electrodes RX0 to RXn in a plane are stored in the detection RAM 13

(7) As the cross capacity Cxy in the noncontact state is larger than the one in the contact state, the falling in the integration output voltage VINT of the integration circuit. 10 may differ as indicated by ΔVa and ΔVb of FIG. 6. Therefore, the threshold value is set to detect the touching operation.

Figures 10A, 10B, 10C:
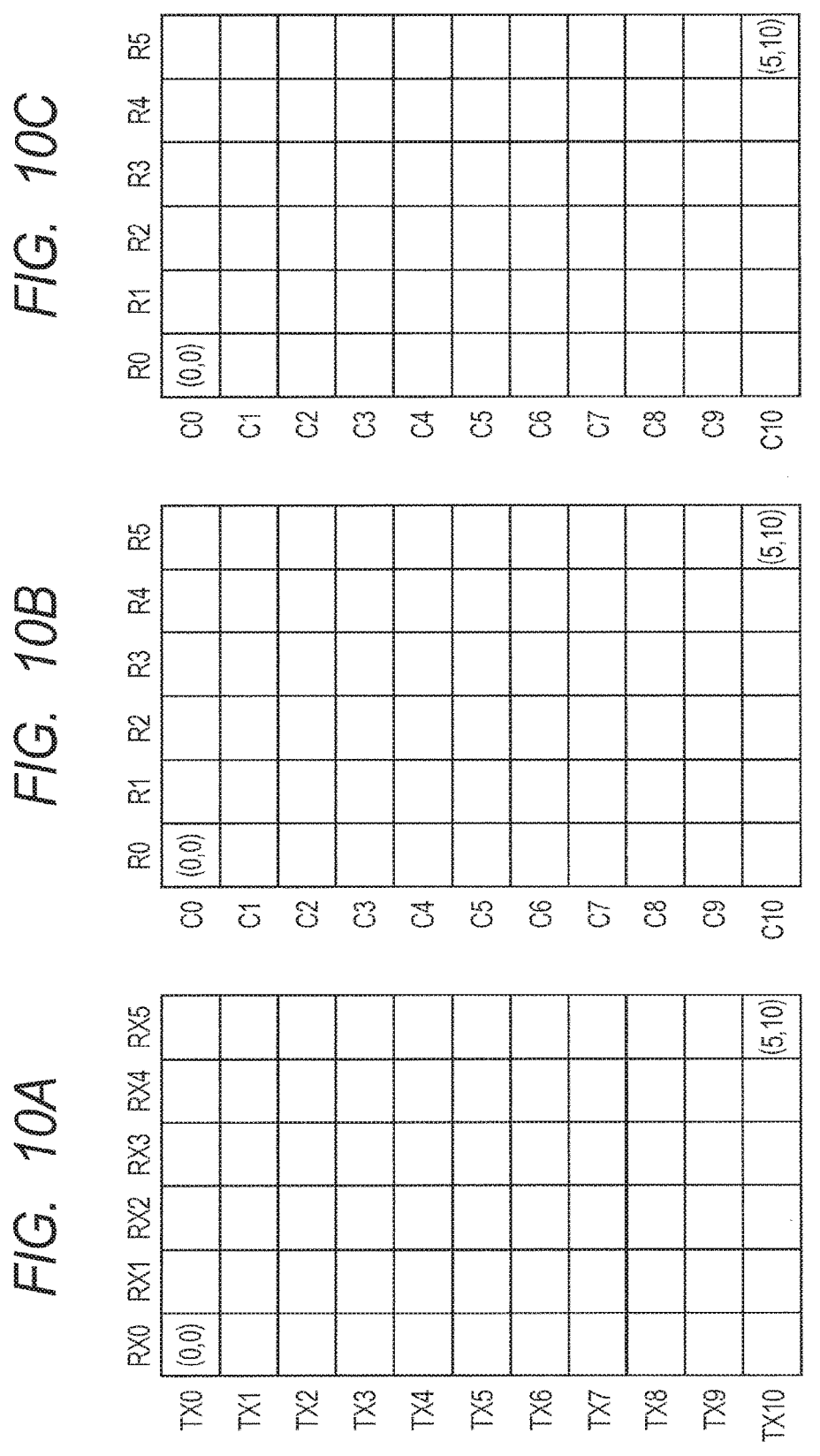

FIGS. 10A, 10B, and 10C respectively show address maps of the touch panel 107, the detection RAM 13 and the calibration RAM 14 of the in-cell type liquid crystal display device according to the example of the present invention.

FIG. 10A shows the address map of the touch panel 107, FIG. 10B shows the address map of the detection RAM 13, and FIG. 10C shows the address map of the calibration RAM 14 to be described later.

Referring to FIGS. 10A, 10B, and 10C, the integration output voltages VINT of the integration circuit 10 corresponding to the intersections between the respective scanning electrodes TX0 to TXm and the respective detection electrodes RX0 to RXn as shown in FIG. 10A are AD converted by the AD converter 12, and the Raw data corresponding to the intersections in the single plane are stored in the detection RAN 13 at the address positions of the intersections.

Likewise, the calibration data corresponding to the intersections between the respective scanning electrodes TX0 to TXm and the respective detection electrodes RX0 to RXn shown in FIG. 10A are stored in the calibration. RAM 14 at the address positions of the intersections.

As FIG. 10A shows, if the address of the intersection between the scanning electrode TX0 and the detection electrode RX0 is set to (0.0), the integration output voltage VINT of the integration circuit. 10 at the intersection is stored in the detection RAM 13 at the address position (0.0), and the calibration data at the intersection between the scanning electrode TX0 and the detection electrode RX0 are stored in the calibration RAM 14 at the address position (0.0).

The calibration will be described hereinafter.

As described above, the cross capacities Cxy at the intersections between the scanning electrodes TX0 to TXm and the detection electrodes RX0 to RXn have individual differences and variations in a plane because of variation and unevenness in the permittivity and thickness of the liquid crystal layer, glass substrate, polarizing plate and adhesive resin. For the purpose of coping with such variation, calibration is indispensable.

Figures 11, 12:
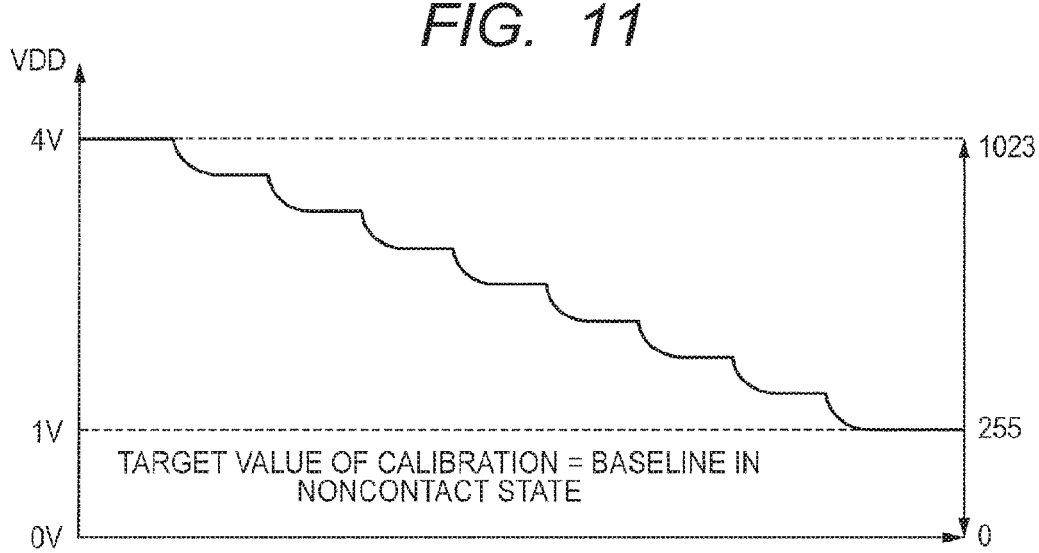
FIG. 11 represents an integrated waveform of an integration circuit in calibration of the in-cell type liquid crystal display device according to the example of the present invention.
FIG. 12 represents calibration data set by the calibration RAM in detection of the adjacent short-circuit failure between the detection electrodes of the in-cell type liquid crystal display device according to the example of the present invention.

(7) As FIG. 11 shows, assuming that the Raw data operation point in the noncontact state is set to 255, the microcomputer MPU rewrites the calibration data in the calibration RAM 14 while setting the point to the calibration target value. Then the calibration voltage VDAC output from the DA converter 15 is varied to be converged.

It is clear that the Raw data operation point in the noncontact state represents those obtained by allowing the sample-hold circuit 11 to sample and hold the integrated output voltage VINT of the integration circuit 10 in the noncontact state, and further owing the 10-bit AD converter 12 to carry out the AD conversion.

(8) The calibration only functions to move the operation point, and never influences the detection sensitivity.

Following equations are established:

Detection sensitivity=(ΔCxy/Cint)×Vstc; and

ΔCxy=Cxy_ut(cross capacity in noncontact state)−Cxy_t(cross capacity in contact state).

Normally, the calibration capacity Cclb is determined so as to set the calibration range which covers the voltage approximately at the intermediate level between the point around [8'h80] in 8 bits, that is, the reference voltage (VREF, 4V in the example) and the voltage at GND (0V). Generally, the calibration capacity Cclb uses the junction capacity of the diode-connected MOS transistor. Accordingly, increase or decrease in the calibration capacity Cclb is adjusted in accordance with the number of the diode-connected MOS transistors connected in parallel.

The inspection. (hereinafter referred to as RX adjacent short-circuit inspection) with respect to the short-circuit between the two adjacent detection electrodes will be described.

The example uses the calibration capacity Cclb as described above for carrying out the RX adjacent short-circuit inspection.

As FIG. 12 shows, upon the RX adjacent short-circuit inspection, the calibration data ([8'h00] in 8 bits) that extract no charge are set at the addresses (columns R0, R2, R4 shown in FIG. 12) corresponding to the odd-numbered detection electrodes in the calibration RAM 14, and the calibration data ([8'hFF]) in 8 bits) that are allowed to sufficiently extract the charge are set at the addresses (columns R1, R3, R5 shown in FIG. 12) corresponding to the even-numbered detection electrodes.

When the calibration data ([8'h00] in 8 bits) that extract no charge are set in the calibration RAM 14, the calibration voltage VDAC output from the DA converter 15 becomes the reference voltage (VREF: 4V in the example). When the calibration data ([8'hFF] in 8 bits) that is allowed to sufficiently extract the charge are set in the calibration RAM 14, the calibration voltage VDAC output from the DA converter 15 becomes the voltage around the GND (0V).

If there is no RX adjacent short-circuit between the two adjacent detection electrodes including the wiring on the flexible wiring substrate (53 of FIG. 1A, MFPC of FIGS. 1A and 1B), the reference voltage VREF is applied to the other end of the calibration capacity Cclb connected to the odd-numbered detection electrode RX.

Figure 13:
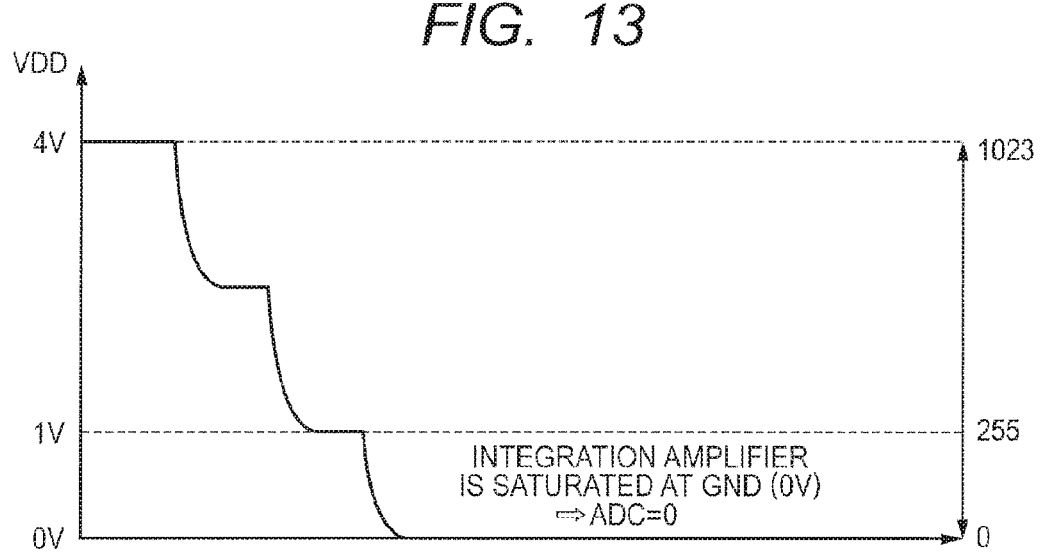
FIG. 13 represents an integrated waveform of the integration circuit when calibration data are set to "00" in the calibration. RAM during inspection of the adjacent short-circuit failure between the detection electrodes of the in-cell type liquid crystal display device according to the example of the present invention.

As a result, the current flowing to the odd-numbered detection electrode RX from the scanning electrode TX flows to the integration circuit 10. As no charge is extracted in the calibration capacity Cclb, it is integrated with the integration capacity CINT of the integration circuit 10. The output of the integration circuit 10 is saturated at the GND as FIG. 13 shows.

Accordingly, the Raw data derived from sampling and holding the integrated output voltage VINT of the integration circuit 10 by the sample-hold circuit 11, and carrying out the AD conversion by the AD converter 12 become zero (Raw=0).

If there is no RX adjacent short-circuit between the two adjacent detection electrodes, the voltage around the GND (0V) is applied to the other end of the calibration capacity Cclb connected to the even-numbered detection electrode RX.

As a result, all the currents applied to the odd-numbered detection electrode RX from the scanning electrode TX flow to the calibration capacity Cclb, that is, all the charges are extracted from the calibration capacity Cclb. The charge is moved from the integration capacity CINT of the integration circuit 10 to increase the integrated output voltage VINT of the integration circuit 10. It is then saturated at the VDD (5V).

The Raw data derived from sampling and holding the integrated output voltage VINT of the integration circuit 10 by the sample-hold circuit 11, and carrying out the AD conversion by the AD converter 12 are set to 1023 (Raw=1023).

As FIG. 15A shows, the column of the Raw data stored in the detection RAM 13, corresponding to the odd-numbered detection electrode RX has the value set to [1023] in 10 bits, and the column corresponding to the even-numbered detection electrode RX has the value set to [0] in 10 bits.

Figure 14:
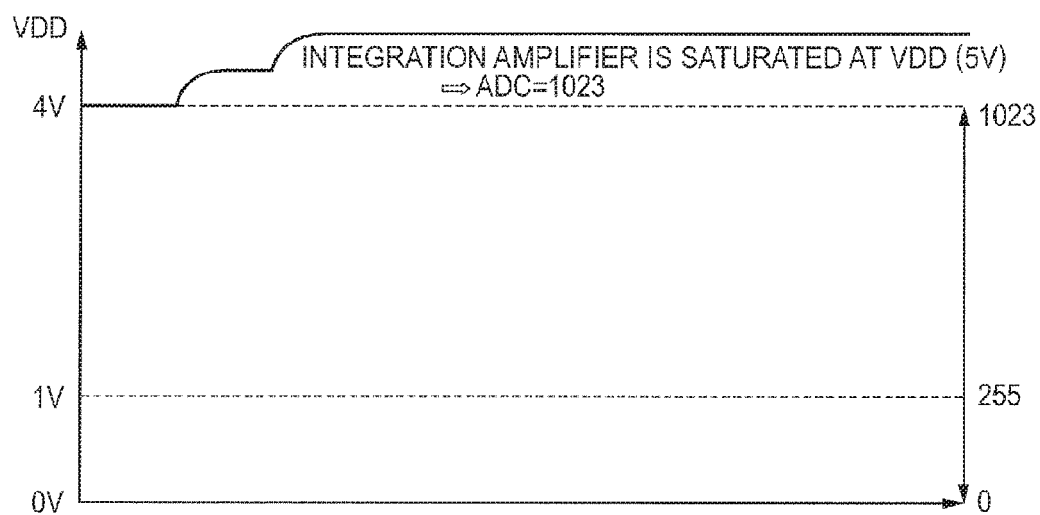
FIG. 14 represents an integrated waveform of the integration circuit when the calibration data are set to "FF" in the calibration RAM during inspection of the adjacent short-circuit failure between the detection electrodes of the in-cell type liquid crystal display device according to the example of the present invention.

Meanwhile, if there is the RX adjacent short-circuit between the two adjacent detection electrodes including the wiring on the flexible wiring substrate (53 of FIG. 1A, and MFPC of FIGS. 1A and 1B), all the currents flowing to the odd-numbered detection electrode RX from the scanning electrode TX are applied to the calibration capacity Cclb connected to the even-numbered detection electrode RX, having the other end to which the voltage near the GND (0V) is applied. In other words, all the charges are extracted, and the charge is moved from the integration capacity CINT of the integration circuit 10 so that the integrated output voltage VINT of the integration circuit 10 increases to be saturated at the VDD (5V) as FIG. 14 shows.

As a result, the Raw data derived from sampling and holding the integrated output voltage VINT of the integration circuit 10 by the sample-hold circuit 11, and carrying out the AD conversion by the AD converter 12 are set to 1023 (Raw=1023).

Hence, among the Raw data stored in the detection RAM 13, those in the columns corresponding to the two adjacent detection electrodes having the RX adjacent short-circuit are set to [1023] in 10 bits as shown in FIG. 15B.

In this way, the example is capable of detecting the RX adjacent short-circuit failure simply for a short period of time.

As has been described comprehensively, the RX adjacent short-circuit failure may be simply detected for a short period of time, in the case where the capacity element with a relatively large capacity value is connected to the odd-numbered detection electrode RX (or even-numbered detection electrode RX) via the switch circuit, and the constant voltage source for outputting the GND voltage is provided to turn the switch circuit ON for the RX adjacent short-circuit inspection so as to connect the capacity element with the other end to which the GND voltage from the constant voltage source is applied.

In this case, if there is no RX adjacent short-circuit failure between the two adjacent detection electrodes including the wiring on the flexile wiring substrate (53 of FIG. 1A, and MFPC of FIGS. 1A and 1B), the column corresponding to the detection electrode RX to which the capacity element having the relatively large capacity value of the Raw data stored in the detection RAM 13 has the value set to [1023] in 10 bits. The column corresponding to the remaining detection electrodes RX of the Raw data has the value set to [255] in 10 bits at the noncontact level after the end of the calibration.

The invention made by the inventor has been described in detail based on the example. It is to be noted that the present invention is not limited to the example, and may be modified into various forms without deviating from scope of the invention.

What is claimed is:
1. A display device comprising:
a first substrate having a plurality of pixels;
a second substrate;
a detection circuit;
a plurality of detection electrodes for detecting a touch presence; and a common electrode divided into blocks and being common to the plurality of pixels,
wherein
a block of the common electrode is applied a touch scanning voltage for detecting the touch presence and a common voltage for displaying,
the detection circuit includes a plurality of calibration capacity elements provided for each of the plurality of detection electrodes, having one end connected to the detection electrode, and supplies a calibration voltage to the other end of the calibration capacity element in a touched position detection process for each intersection between the respective detection electrodes and the common electrode,
the detection circuit supplies a reference voltage to both ends of the calibration capacity element,
a voltage of the detection electrode is varied by the calibration voltage supplied to the other end of the calibration capacity element in the touched position detection process,
the detection circuit includes a memory element which stores a calibration digital data for each intersection between the respective detection electrodes and blocks of the common electrode, and
the calibration voltage is generated by the calibration digital data.

2. The display device according to claim 1,
wherein the detection circuit includes a DA converter which converts the calibration digital data stored in the memory element into the calibration voltage.

3. The display device according to claim 1,
wherein the first substrate includes the common electrode.

4. The display device according to claim 1,
wherein the detection circuit includes an integration circuit and a sample-hold circuit.

5. The display device according to claim 2,
wherein the detection circuit includes an A/D converter,
the memory element stores output digital data from the A/D converter.

6. A display device comprising:
a first substrate having a plurality of pixels;
a second substrate;
a detection circuit;
a plurality of detection electrodes for detecting a touch event; and
a common electrode divided into a plurality of blocks and facing to the plurality of pixels commonly,
wherein a plurality of blocks of the common electrode is applied a common voltage for displaying and a touch scanning voltage for detecting a touch event;
the detection circuit includes a plurality of calibration capacity elements having one electrode connected to each of the plurality of detection electrodes, and supplies a calibration voltage to the other end of the calibration capacity element,
the detection circuit supplies a reference voltage to both ends of the calibration capacity element,
a voltage of the detection electrode is varied by the calibration voltage supplied to the other end of the calibration capacity element in a touch event detection process,
the detection circuit includes a memory element which stores calibration digital data for each intersection between the respective detection electrodes and blocks of the common electrode, and
the calibration voltage is generated by the calibration digital data.

7. The display device according to claim 6,
wherein the detection circuit includes a PA converter which converts the calibration digital data stored in the memory element into the calibration voltage.

8. The display device according to claim 6,
wherein the detection circuit includes an integration circuit and a sample-hold circuit.

9. The display device according to claim 6,
wherein the detection circuit includes an AID converter and the memory element which stores output data from the A/D converter.

* * * * *